United States Patent
Weathers (10) Patent No.: US 6,189,196 B1
(45) Date of Patent: *Feb. 20, 2001

(54) PRECISION-BALANCED SHAFT AND METHOD

(75) Inventor: David L. Weathers, Henderson, TN (US)

(73) Assignee: Triangle Pacific Corp., Addison, TX (US)

(*) Notice: Under 35 U.S.C. 154(b), the term of this patent shall be extended for 0 days.

This patent is subject to a terminal disclaimer.

(21) Appl. No.: 09/505,331

(22) Filed: Feb. 16, 2000

Related U.S. Application Data (63) Continuation-in-part of application No. 09/478,016, filed on Jan. 5, 2000.

(51) Int. Cl.$^7$ .............................. B23P 11/02; B27C 5/00; B27M 1/00; B23B 31/00
(52) U.S. Cl. ........................ 29/450; 29/421.1; 144/134.1; 144/135.2; 144/136.1; 144/232; 144/237; 144/371; 279/2.08; 279/4.03; 403/31; 403/373; 409/234
(58) Field of Search ................................. 29/421.1, 450; 144/134.1, 135.2, 136.1, 137, 222, 223, 232, 325, 237, 368, 369, 371; 279/2.06, 2.08, 4.01, 4.03; 403/5, 15, 24, 31, 369, 373; 409/141, 234

(56) References Cited

U.S. PATENT DOCUMENTS

| | | | |
|---|---|---|---|
| 1,075,907 | * 10/1913 | Dunton | 144/237 |
| 1,196,191 | * 8/1916 | Waugh | 144/232 |
| 2,751,942 | * 6/1956 | Emmons et al. | 144/237 |
| 5,303,754 | * 4/1994 | Rautio | 144/237 |
| 5,462,293 | 10/1995 | Samelius et al. | |
| 5,672,026 | 9/1997 | Disborg. | |
| 5,855,446 | 1/1999 | Disborg. | |

FOREIGN PATENT DOCUMENTS

226727 * 6/1925 (GB) .................................. 144/237

* cited by examiner

Primary Examiner—W. Donald Bray
(74) Attorney, Agent, or Firm—Adams, Schwartz & Evans, P.A.

(57) ABSTRACT

A shaft assembly including an inner hub having a centrally-disposed bore therethrough and an outer surface for carrying a first member concentrically thereon for rotation therewith, an outer hub having a centrally-disposed bore therethrough and an outer surface for carrying a second member thereon for rotation therewith. The bore of the outer hub is adapted for receiving the inner hub concentrically therein for rotation therewith. An outer pressure-expansible sleeve is provided for being concentrically-mounted within the bore of said outer hub and pressurized for locking the outer hub onto the inner hub. An inner pressure-expansible sleeve is concentrically-positioned in the bore of the inner hub and pressurized for locking the inner hub onto a rotatable spindle, whereby the inner hub and outer hub and the respective members mounted thereon are locked in fixed, concentric relation relative to each other and to the rotatable spindle. The particular embodiment of rotatable member disclosed in the application is a cutter plate such as is used in wood forming and shaping operations.

13 Claims, 5 Drawing Sheets

PRECISION-BALANCED SHAFT AND METHOD

This application is a continuation-in-part of application Ser. No. 09/478,016; filed on Jan. 5, 2000, and titled PRECISION-BALANCED CUTTER HEAD AND METHOD.

TECHNICAL FIELD AND BACKGROUND OF THE INVENTION

This invention relates to a precision balanced shaft and a method of balancing a shaft. The particular embodiment disclosed herein by way of illustration is a multi-plate rotatable cutter head, a pair of which are used to simultaneously from a tongue on one side of a flooring strip and a mating groove on the other side as the flooring strips pass between them. Commercial manufacture of flooring takes place at high speed and requires extreme precision since the assembled flooring strips must mate with essentially no cracks, spaces or gaps. It is therefore essential to use extremely sharp, well-balanced cutter plates. As used herein, the term "cutter plate" refers to a flat, circular disk with cutting teeth around the periphery and a center bore for being mounted onto a motor spindle. As described below, two or more stacked cutter plates with other assembly parts make up a "cutter head" assembly. A properly operating cutter head assembly as a unit must not only be as concentric as possible, but the blades must be concentric relative to each other and must be properly spaced from each other.

The principles of this invention have application in any environment where rapidly-rotating shafts must be precision balanced, for whatever reason. Other applications of this invention therefore include machine tool shafts, particularly numerically-controlled milling machines, lathes, drill presses and the like, wood-processing machines, such as lathes, drill presses, planers, joiners, sanders, shapers, routers, and saws, including circular saws, miter saws. Other applications include watercraft, and aircraft. Members which may be mounted on the shafts include cutter blades, sensors of various types, accessory attachments, cams and switches.

Insofar as the exemplary embodiment is concerned, a number of prior art cutter head assembly types and methods are known. In a prior art, a simple tapered, self-centering collet is used, onto which are stacked three rotatable cutter plates which collectively form the profile to be cut onto the edge of the flooring strip. Tightening the cutter plates onto the collet tends to reduce the concentricity of the assembly, such that the required balance and concentricity must be achieved by using ajoining stone which grinds the cutting edges of the cutter plates to compensate for the initial out-of-round condition. Still, eccentricity of 0.003–4 inches is the best that can ordinarily be achieved. Moreover, the requirement to grind away part of the cutting edges reduces the life of the cutter plates by one-half and requires that all of the cutter plates be replaced at the same time.

One attempted solution to this problem involves the use of a hydraulic pressure sleeve, such as made by ETP Transmission AB. The pressure sleeve is fitted onto the motor spindle, and has a central void which is pressurized with grease. The pressure sleeve expands towards the spindle and the blades. Since the pressure is exerted evenly onto all surfaces and in all directions, the sleeve is automatically centered.

However, this assembly technique does not center the blades themselves, nor does it balance the blades relative to each other. This is done with shims, since often the tolerances of the cutter plates are outside the range of pressure expansion of the pressure sleeve.

The requirement to use shims to space the blades has been eliminated by using intermediate spacing plates and nuts to correct the distance between cutter plates on the pressure sleeve as wear occurs. This type of assembly also eliminates the need to join the cutting teeth, thus providing a longer life to the cutter plates. However, there are also disadvantages to this technique, including the requirement that the entire assembly must be removed from the motor spindle for adjustment. It is therefore difficult to maintain concentricity while making adjustments to the cutter plate spacing. In addition, sawdust tends to become trapped between the cutter plates, making adjustment within the environment of a wood flooring plant difficult. The invention disclosed in this application solves these problems by utilizing two separate pressure sleeves performing different functions.

SUMMARY OF THE INVENTION

Therefore, it is an object of the invention to provide a shaft assembly which permits adjustment of the shaft without removing the shaft from its mounting.

It is another object of the invention to provide a shaft which does not require shims or spacers to adjust the balance of the shaft.

It is another object of the invention to provide a shaft which maintains constant concentricity.

It is another object of the invention to provide a shaft wherein concentricity and plate spacing adjustments are made from the same side of the shaft assembly.***

These and other objects of the present invention are achieved in the preferred embodiments disclosed below by providing a rotatable shaft assembly comprising an inner hub having a centrally-disposed bore therethrough and an outer surface for carrying at least one rotatable member concentrically thereon for rotation therewith, an outer hub having a centrally-disposed bore therethrough and an outer surface for carrying at least one rotatable member thereon for rotation therewith. The bore of the outer hub is adapted for receiving the inner hub concentrically therein for rotation therewith. An outer pressure-expansible sleeve is provided for being concentrically-mounted within the bore of the outer hub and pressurized for locking the outer hub onto the inner hub. An inner pressure-expansible sleeve is concentrically-positioned in the bore of the inner hub and pressurized for locking the inner hub onto a rotatable spindle, whereby the inner hub and outer hub and the respective rotatable members mounted thereon are locked in fixed, concentric relation relative to each other and to the rotatable spindle.

According to one preferred embodiment of the invention, the inner and outer hubs each include shoulders thereon for supporting the respective rotatable members thereon.

According to another preferred embodiment of the invention, the shoulders include threaded bolt holes therein for receiving bolts extending through aligned bolt holes in the respective rotatable members.

According to yet another preferred embodiment of the invention, the outer pressure-expansible sleeve includes a shoulder for mounting a rotatable member thereon.

According to another preferred embodiment of the invention, the outer hub includes vertical adjustment threads thereon and includes a threaded hub adjusting nut threaded onto the outer hub and mounted in fixed vertical relation to the inner hub and rotatable for vertically adjusting the outer hub and the cutter blade thereon relative to the inner hub.

According to yet another preferred embodiment of the invention, the outer pressure sleeve includes vertical adjustment threads thereon and a pressure sleeve adjusting nut threaded onto the outer pressure sleeve, held in fixed vertical relation to the inner hub and rotatable for vertically adjusting the outer pressure-expansible sleeve and the cutter blade thereon relative to the inner hub.

According to yet another preferred embodiment of the invention, the hub adjusting nut includes a plurality of spaced-part adjustment holes for receiving an adjustment wrench having correspondingly spaced-apart lugs thereon for being received in the adjustment holes whereby rotational movement of the wrench rotates the hub adjusting nut.

According to another preferred embodiment of the invention, the pressure sleeve adjusting nut includes a plurality of spaced-part adjustment holes for receiving correspondingly spaced-apart lugs on an adjustment wrench whereby rotational movement of the wrench rotates the outer pressure sleeve adjusting nut.

According to yet another preferred embodiment of the invention, the hub adjusting nut includes a plurality of spaced-part adjustment holes for receiving correspondingly spaced-apart lugs on an adjustment wrench whereby rotational movement of the wrench rotates the outer hub to adjusting nut, the pressure sleeve adjusting nut includes a plurality of spaced-part adjustment holes for receiving a adjustment wrench having correspondingly spaced-apart lugs thereon for being received in the adjustment holes whereby rotational movement of the wrench rotates the outer pressure sleeve adjusting nut.

According to yet another preferred embodiment of the invention, the hub adjusting nut includes a plurality of access slots therein for permitting access by the adjusting wrench through the hub adjusting nut to the adjustment holes of the pressure sleeve adjusting nut, whereby the pressure sleeve adjusting nut can be adjusted without removing the hub adjusting nut.

According to yet another preferred embodiment of the invention, the inner hub, the outer hub and the outer pressure-expansible sleeve each have shoulders thereon for receiving a respective rotatable members concentrically thereon in a stacked array.

According to yet another preferred embodiment of the invention, the inner pressure-expansible sleeve includes a flange on one end thereof and threads on an opposing end thereof for receiving a threaded lock nut thereon for capturing between the flange and the lock nut, the outer hub and outer pressure-expansible sleeve.

According to yet another preferred embodiment of the invention, a second like cutter head is positioned for rotating in spaced-apart lateral relation from the cutter head and defines a cutter head assembly for simultaneously cutting a profile onto opposing edges of an elongate workpiece moving therebetween.

According to yet another preferred embodiment of the invention, the workpiece comprises a flooring element, and the cutter head and the second like cutter head have blades thereon shaped to apply respective tongue and groove profiles to opposing edges of the flooring element.

According to yet another preferred embodiment of the invention, the flooring element comprises a hardwood flooring strip, plank or block.

An embodiment of the method of concentrically locking a plurality of rotatable cutting elements in precise fixed relation to each other and to a spindle on which the cutting elements are mountable for rotation according to the invention comprises the steps of positioning the rotatable cutting elements on support members in a predetermined relationship to each other, applying a first pressure-expansible sleeve to at least one of the support members on which a respective at least one of the cutting elements are mounted and locking the rotatable cutting elements to each other in the predetermined relationship by pressurizing the first pressure-expansible sleeve to thereby define a cutter head wherein the cutting elements arc immobilized relative to each other. The cutter head is mounted onto a second pressure-expansible sleeve having a bore therein and a rotatable spindle in the bore of the second pressure-expansible sleeve. The second pressure-expansible sleeve is locked onto the spindle by pressurizing the second pressure-expansible sleeve to thereby immobilize the second pressure-expansible sleeve and the spindle relative to each other.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description of Assembly

Figure 1:
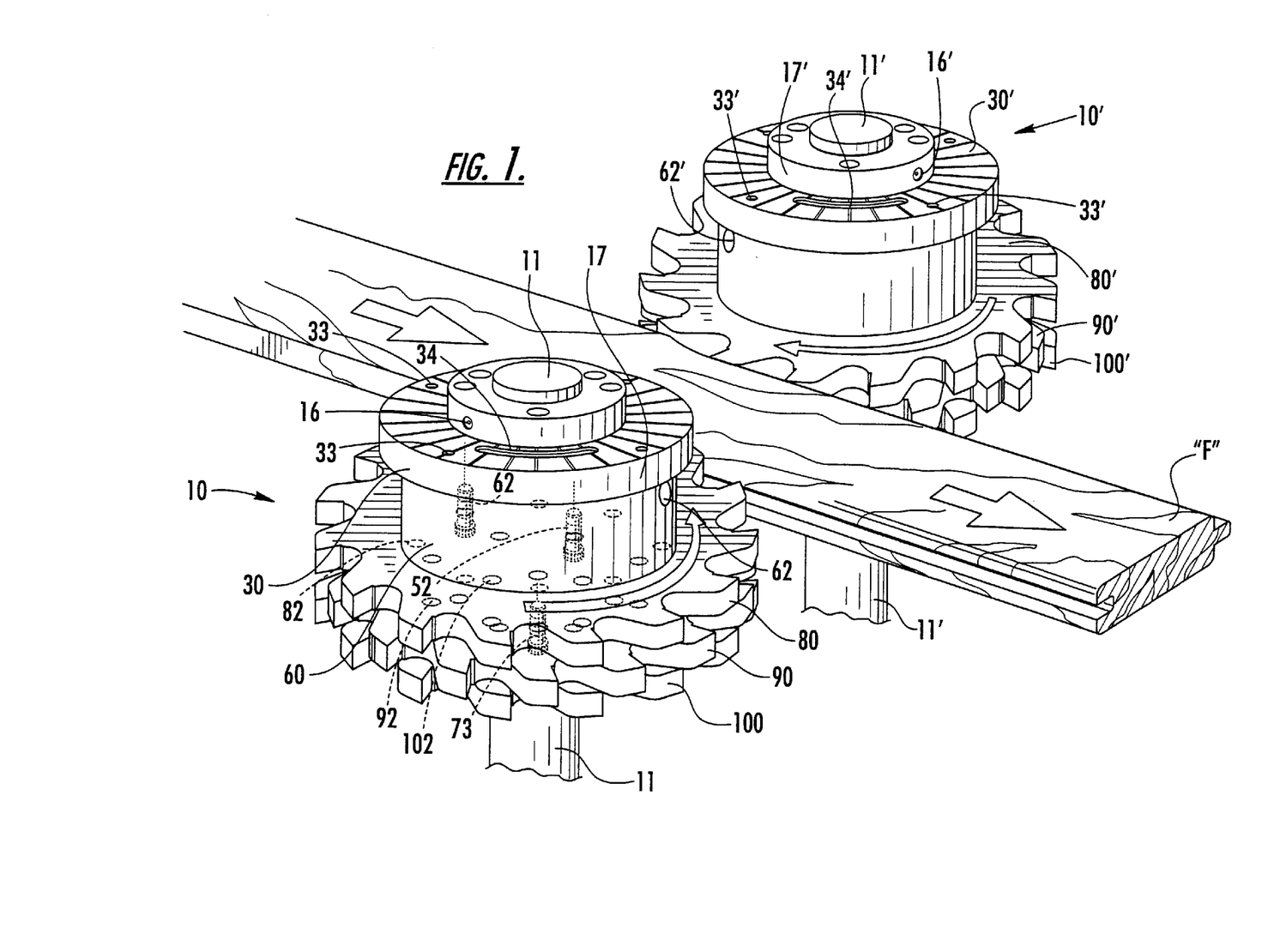
FIG. 1 is an fragmentary environmental view of a pair of cutter head assemblies according to an embodiment of the present invention for forming a tongue and groove on respective edges of a flooring strip.

Referring now specifically to the drawings, a pair of rotatable members in the form of cutter head assemblies 10 and 10' for forming a tongue and groove on respective edges of a flooring strip "F" according to the present invention is illustrated in FIG. 1. Both cutter head assemblies 10 and 10' are identical insofar as the inventive concepts disclosed in this application are concerned. Therefore, it will be understood that in the following description reference to cutter head assembly 10 is applicable both to cutter head assembly 10 and cutter head assembly 10', shown in FIG. 1. Cutter head assemblies 10 and 10' arc mounted on opposite sides of a path along which flooring strips "F" pass during manufacture, and simultaneously form a tongue on one side and a mating groove on the other side as the flooring strip "F" passes between them. The cutter head assemblies 10 and 10' are mounted for counter-rotation on respective motor spindles 11 which are rotated by heavy duty industrial motors (not shown). In one embodiment, the motor which rotates cutter head assembly 10 and forms the groove is a 20 HP motor rotating at 3,600 rpm, and the motor which rotates cutter head assembly 10' and forms the tongue is a 30 HP motor rotating at 3,600 rpm. Of course, the invention contemplates the use of any type, speed or power of motor.

Figure 2:
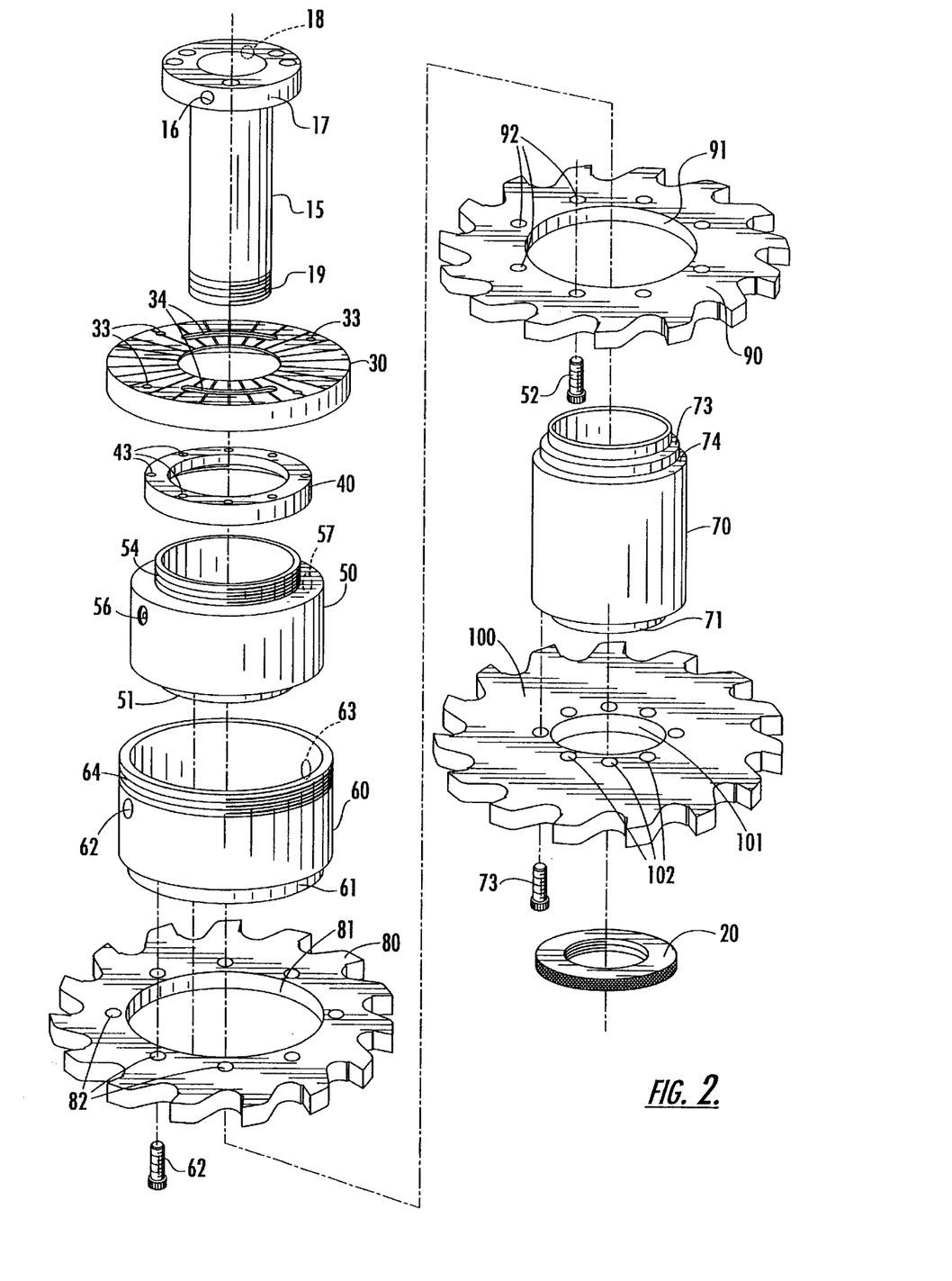
FIG. 2 is an exploded view of a cutter head assembly 10 assembly as illustrated in FIG. 1.

Referring now to FIG. 2, cutter head assembly 10 is shown and illustrated in exploded form. An inner pressure sleeve 15 carries the other elements of the cutter head assembly 10 and is mounted onto motor shaft 11. Inner pressure sleeve 15 has an internal void which is pressurized with grease through a pressure port 16 positioned on a flange 17. A pressure release port 18 permits pressure within the inner pressure sleeve 15 to be released when the cutter head assembly 10 is being adjusted or removed from the motor shaft 11.

When pressurized, the inner pressure sleeve 15 expands towards the shaft 11, exerting pressure evenly onto all surfaces and in all directions, automatically centering the pressure sleeve 15 onto the motor shaft 11. The end of the inner pressure sleeve 15 opposite the flange 17 is provided with exterior threads 19 for receiving a threaded lock nut 20, thus capturing the remaining elements of the cutter head assembly 10.

The inner pressure sleeve 15 is positioned concentrically through an hub adjusting nut 30, a pressure sleeve adjusting nut 40, an outer pressure sleeve 50, an outer hub 60 and an inner hub 70. Upper, middle and lower cutter plates 80, 90 and 100, respectively, each have central openings 81, 91 and 101 of different diameters for fitting onto shoulders having respective diameters, as described below. Each of the cutter plates 80, 90, 100 are also provided with bolt holes 82, 92, 102 which receive bolts 52, 62 and 73, and thus lock the cutter plates 80, 90 and 100 in proper orientation.

Specifically, the inner hub 70 resides innermost on the outer surface of the inner pressure sleeve 15. Pressurization of the inner pressure sleeve 15 clamps the inner hub 70 in a fixed orientation to the inner pressure sleeve 15 until the pressure is released. Inner hub 70 includes a bottom shoulder 71 which receives cutter plate 100. The radially-extending portion of the shoulder 71 includes bolt holes (not shown) which receive bolts 73 which also extend through the holes 102 in the cutter plate 100 and thus locks the cutter plate 100 to the inner hub 70.

The outer pressure sleeve 50 resides adjacent the outer wall of the inner hub 70 and includes a bottom shoulder 51 which receives the cutter plate 90. The radially-extending portion of the bottom shoulder 51 includes bolt holes (not shown) which receive bolts 52 which also extend through the holes 92 in the cutter plate 90 and thus locks the cutter plate 90 to the outer pressure sleeve 50. The pressure sleeve 50 includes pressure port 56 and a pressure release port 57.

The outer hub 60 resides concentric to and adjacent the outer wall of the outer pressure sleeve 50 and includes a bottom shoulder 61 which receives the cutter plate 80. The radially-extending portion of the bottom shoulder 61 includes bolt holes (not shown) which receive bolts 62 which also extend through the holes 82 in the cutter plate 80 and thus locks the cutter plate 80 to the outer hub 60. The outer hub 60 includes an access hole 62 aligned with the pressure port 56 in the outer pressure sleeve 50 for permitting access to the pressure port 56 and an access hole 63 aligned with the pressure release port 57 for permitting access to the pressure release port 57. As is shown in FIG. 1, the cutter plates 80, 90, 100 are thus stacked into a vertical array, each on a shoulder of a different, concentric element.

The position of cutter plate 100 provides a reference point against which the cutter plates 80 and 90 are adjusted as needed. This is accomplished by rotation of the hub adjusting nut 30 and/or the pressure sleeve adjusting nut 40. Both nuts 30 and 40 are supported on respective upper shoulders 73, 74 of the inner hub 70 and are thus vertically immobilized with reference to inner hub 70.

Figure 5:
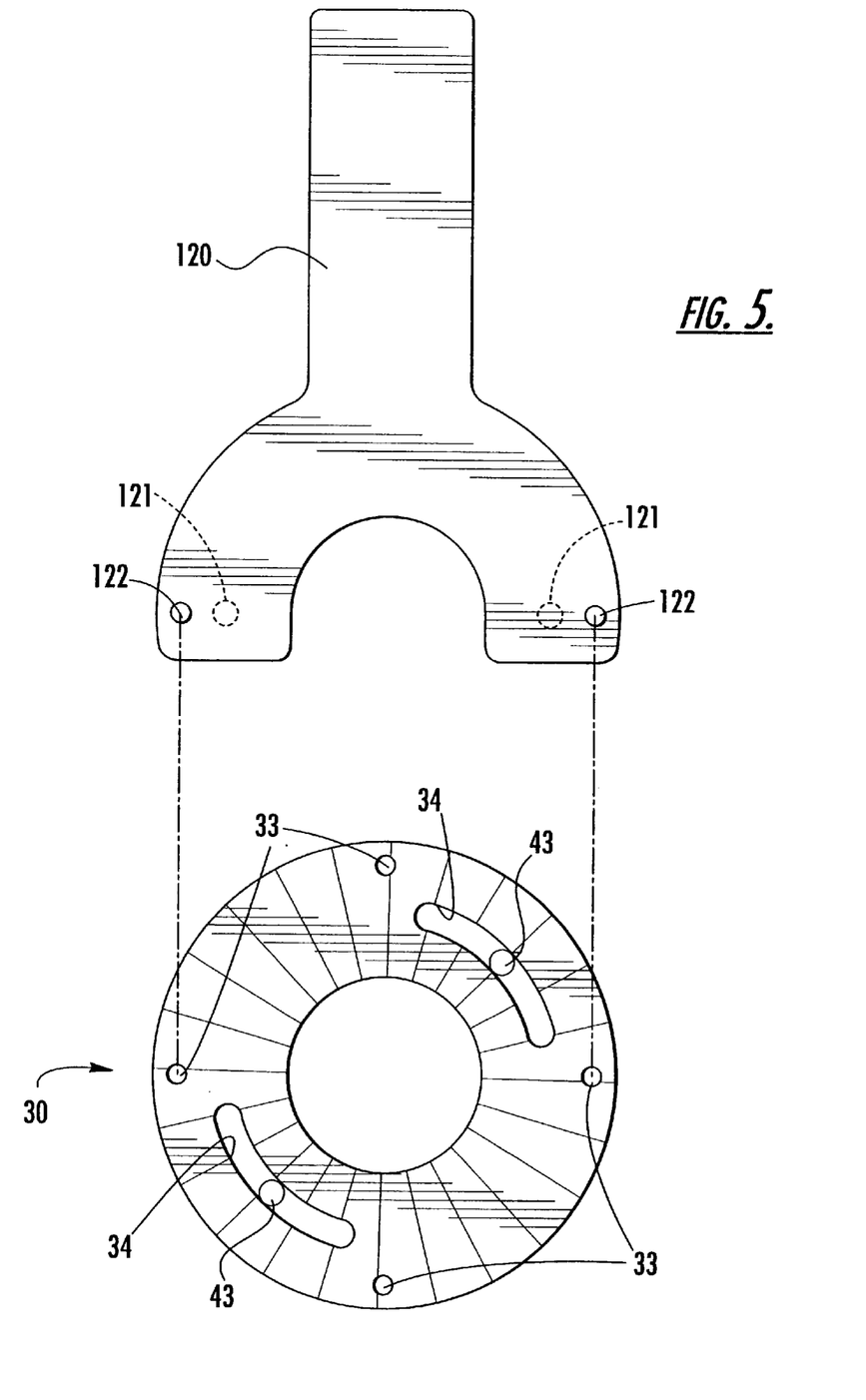
FIG. 5 is atop plan view illustrating adjustment of the pressure sleeve adjusting nut.

The hub adjusting nut 30 is provided with internal threads which mate with external threads 64 on the top end of the outer hub 60, such that rotation of the hub 30 raises or lowers the outerhub 60 and thus the cutterplate 80. Adjustment holes 33 in the top surface of the hub adjusting nut 30 permit rotation with a special wrench, as shown in FIG. 5. As described in further detail below, access slots 34 permit access through the hub adjusting nut 30 to the pressure sleeve adjusting nut 40.

Similarly, pressure sleeve adjusting nut 40 is provided with internal threads which mate with external threads 54 on the top end of the outer pressure sleeve 50, such that rotation of the pressure sleeve adjusting nut 40 raises or lowers the outer pressure sleeve 50 and thus the cutterplate 90. Adjustment holes 43 in the top surface of the pressure sleeve adjusting nut 40 permit rotation with a special wrench, as shown in FIG. 4.

Figure 3:
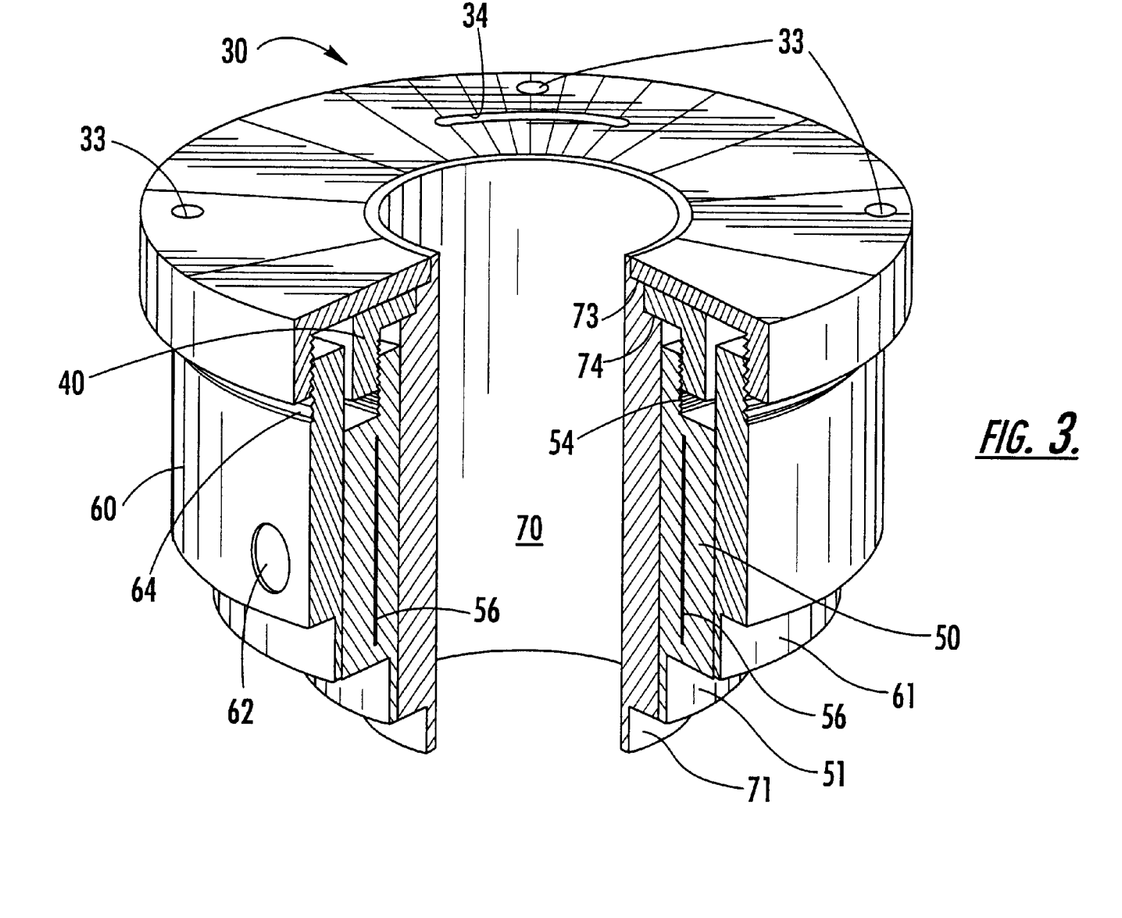
FIG. 3 is a fragmentary vertical cut-away of a portion of the cutter head assembly 10 shown in FIGS. 1 and 2.

The order of assembly of the cutter head assembly 10 is shown in FIG. 3, where the inner pressure sleeve 15 and the cutter plates 80, 90 and 100 have been omitted for clarity. Note the arrangement of the shoulders 51, 61, 71 which support, respectively the cutter plates 90, 80 and 100. As noted above, the hub and pressure sleeve adjusting nuts 30, 40 are supported on shoulders 73 and 74 of inner hub 70. Thus, rotation of the nut 30 or 40 will create vertical movement of the respective cutter plate 80 or 90.

Note also the void 56 in the outer pressure sleeve 50 and its position exterior to the inner hub 70 and interior to the outer hub 60. Pressurization of the outer pressure sleeve 50 thereby locks both the inner hub 70 and the outer hub 60 in their respective position independent of the pressurization state of the inner pressure sleeve 15.

Figure 4:
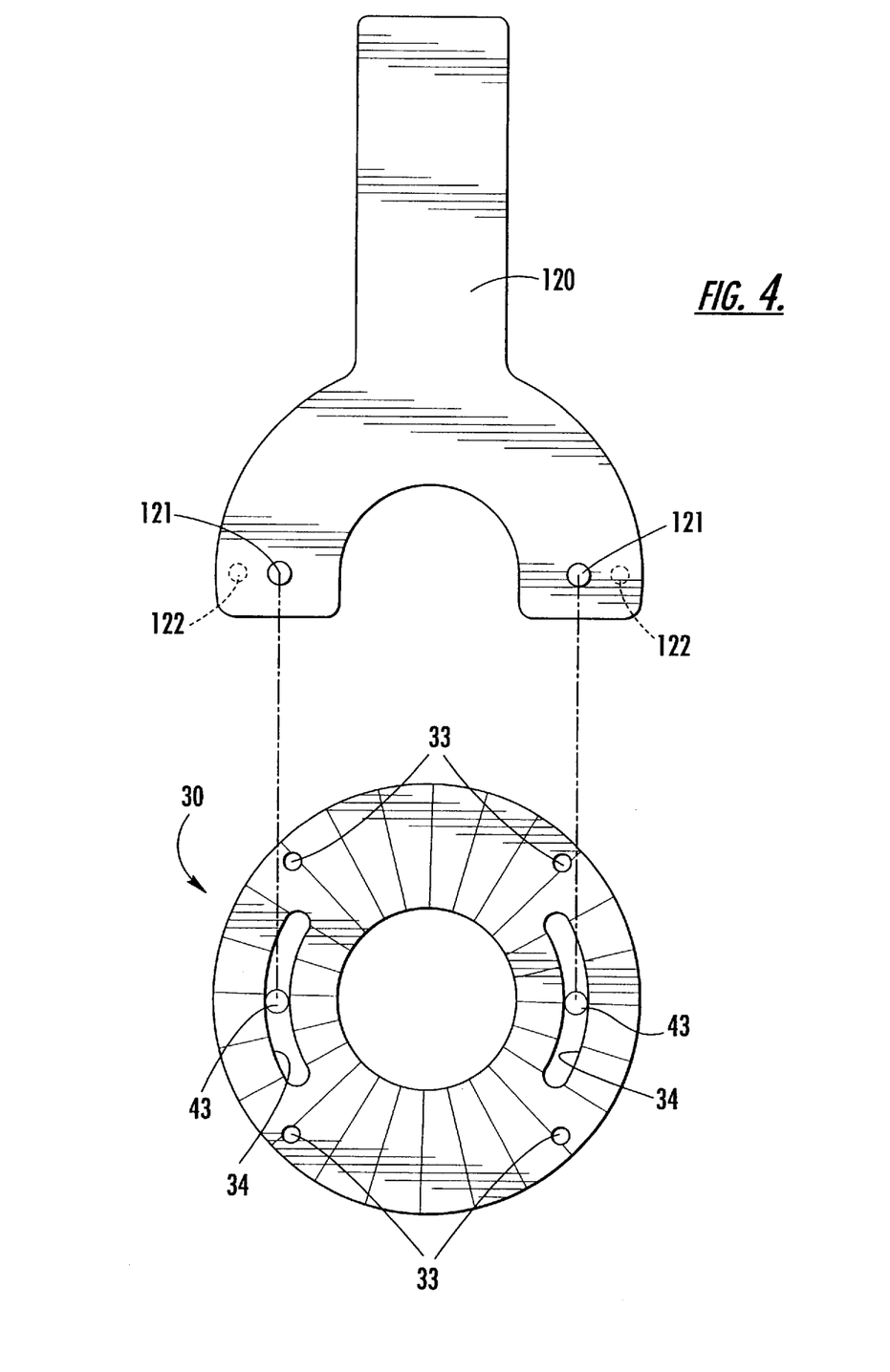
FIG. 4 is a top plan view illustrating adjustment of the hub adjusting nut.

As is shown in FIG. 4, adjustment of the outer pressure sleeve 50 and thus the attached cutter plate 90 can be accomplished without removing the hub adjusting nut 30 or the hub 60 by use of a generally Y-shaped wrench 120 which includes two spaced-apart lugs 121 on one side spaced to fit through the slots 34 in the hub adjusting nut 30 and into two opposed adjustment holes 43 in the top surface of the pressure sleeve adjusting nut 40. As shown, there are 8 adjustment holes 43 in the pressure sleeve adjusting nut 40, each spaced 45 degrees apart. The slots 34 in the hub adjusting nut 30 are diametrically-opposed and each define an arc of 70 degrees. Thus, there is always at least one of the 8 adjustment holes 43 exposed through each of the slots 34 for engagement by the lugs 121 of the wrench 120.

Adjustment of the of the outer hub 60 and thus the attached cutter plate 80 is accomplished by using the opposite side of the wrench 120, which has two spaced-apart lugs 122 which fit into any diametrically-opposed of the four equally-spaced adjustment holes 33, as shown in FIG. 5.

Method of Assembling Cutter Head Assembly

Assembly of the cutter head assembly 10 is accomplished by bolting the bottom cutter plate 100 onto the shoulder 71 of the inner hub 70 using bolts 73. The inner hub 70 is placed into the outer pressure sleeve 50. The middle cutter plate 90 is then placed onto the shoulder 51 of the outer pressure sleeve 50 and bolted into place with the bolts 52. The assembly is inverted and placed onto the inner hub 70 and the attached bottom cutter blade 100. The upper cutter plate 80 is bolted to the shoulder 61 of the outer hub 60 with bolts 62. The outer hub 60 is then placed over the outer pressure sleeve 50. At this point all three cutter plates 80, 90 and 100 have been properly stacked, as shown in FIG. 1.

The pressure sleeve adjusting nut 40 is placed onto the shoulder 74 of the inner hub 70 and threaded onto the threads 54 of the pressure sleeve 50. The outer hub 30 is then placed on the shoulder 73 of the inner hub 70 and threaded onto the threads 64 on the upper end of the outer hub 60.

The inner pressure sleeve 15 is then inserted into the center of the inner hub 70, and the lock nut 20 is threaded onto the threads 19 on the bottom of the inner pressure sleeve 15 and tightened to the proper torque. The entire cutter head assembly 10 is then placed onto the motor spindle 11. The inner pressure sleeve 15 is then pressurized by introducing grease under pressure through the pressure port 16. Pressure is generally in the range 400–500 bar. The entire cutter head assembly 10 is locked onto the spindle 11.

The outer pressure sleeve 50 is then pressurized by introducing grease into the pressure port 56. Pressure is generally in the range 400–500 bar. The pressure locks the top and middle cutter plates 80 and 90 together, to the outer pressure sleeve 50 and to the inner hub 70. According to this structure and assembly technique, the pressure exerted by the inner pressure sleeve 15 and the outer pressure sleeve 50 are isolated from each other and therefore do not interfere with the other. Concentricity of the cutter head assembly 10 on the spindle 11 established by pressurizing the inner pressure sleeve 15 is unaffected by subsequent pressurization of the outer pressure sleeve 50.

A cutter head assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A rotatable shaft assembly, comprising:

(a) an inner hub having a centrally-disposed bore therethrough and an outer surface for carrying a first member concentrically thereon for rotation therewith;

(b) an outer hub having a centrally-disposed bore therethrough and an outer surface for carrying a second member thereon for rotation therewith, the bore of the outer hub adapted for receiving the inner hub concentrically therein for rotation therewith;

(c) an outer pressure-expansible sleeve for being concentrically-mounted within the bore of said outer hub and pressurized for locking the outer hub onto the inner hub; and (d) an innerpressure-expansible sleeve for being concentrically-positioned in the bore of the inner hub and pressurized for locking the inner hub onto a rotatable spindle, whereby the inner hub and outer hub and the first and second members mounted thereon are locked in fixed, concentric relation relative to each other and to the rotatable spindle.

2. A rotatable shaft assembly according to claim 1, wherein said inner and outer hubs each include shoulders thereon for supporting the respective first and second members thereon.

3. A rotatable shaft assembly according to claim 2, wherein said shoulders include threaded bolt holes therein for receiving bolts extending through aligned bolt holes in the respective first and second members.

4. A rotatable shaft assembly according to claim 1, wherein said outer pressure-expansible sleeve includes a shoulder for mounting a cutter plate thereon.

5. A rotatable shaft assembly according to claim 1, wherein said outer hub includes vertical adjustment threads thereon and includes a threaded hub adjusting nut threaded onto said outer hub and mounted in fixed vertical relation to the inner hub and rotatable for vertically adjusting the outer hub and the second member thereon relative to the inner hub.

6. A rotatable shaft assembly according to claim 1, wherein said outer pressure sleeve includes vertical adjustment threads thereon and a pressure sleeve adjusting nut threaded onto said outer pressure sleeve, held in fixed vertical relation to the inner hub and rotatable for vertically adjusting the outer pressure-expansible sleeve and the cutter blade thereon relative to the inner hub.

7. A rotatable shaft assembly according to claim 6, wherein said hub adjusting nut includes a plurality of spaced-part adjustment holes for receiving a adjustment wrench having correspondingly spaced-apart lugs thereon for being received in the adjustment holes whereby rotational movement of the wrench rotates the hub adjusting nut.

8. A rotatable shaft assembly according to claim 6, wherein said pressure sleeve adjusting nut includes a plurality of spaced-part adjustment holes for receiving correspondingly spaced-apart lugs on an adjustment wrench whereby rotational movement of the wrench rotates the outer pressure sleeve adjusting nut.

9. A rotatable shaft assembly according to claim 6, wherein:

(a) said hub adjusting nut includes a plurality of spaced-part adjustment holes for receiving correspondingly spaced-apart lugs on an adjustment wrench whereby rotational movement of the wrench rotates the outer hub adjusting nut; and (b) said pressure sleeve adjusting nut includes a plurality of spaced-part adjustment holes for receiving an adjustment wrench having correspondingly spaced-apart lugs thereon for being received in the adjustment holes whereby rotational movement of the wrench rotates the outer pressure sleeve adjusting nut.

10. A rotatable shaft assembly according to claim 9, wherein said hub adjusting nut includes a plurality of access slots therein for permitting access by the adjusting wrench through the hub adjusting nut to the adjustment holes of the pressure sleeve adjusting nut, whereby the pressure sleeve adjusting nut can be adjusted without removing the hub adjusting nut.

11. A rotatable shaft assembly according to claim 1, wherein said inner hub, said outer hub and said outer pressure-expansible sleeve each have shoulders thereon for receiving a plurality of rotatable members concentrically thereon in a stacked array.

12. A rotatable cutter head according to claim 1, wherein said inner pressure-expansible sleeve includes a flange on one end thereof and threads on an opposing end thereof for receiving a threaded lock nut thereon for capturing between the flange and the lock nut, the outer hub and outer pressure-expansible sleeve.

13. A method of concentrically locking a plurality of rotatable members in precise fixed relation to each other and to a spindle on which the rotatably members are mountable for rotation, comprising the steps of:

(a) positioning the rotatable members on support members in a predetermined relationship to each other;

(b) applying a first pressure-expansible sleeve to at least one of the support members on which a respective at least one of said rotatable members are mounted;

(c) locking the rotatable members to each other in the predetermined relationship by pressurizing the first pressure-expansible sleeve to thereby define rotatable members which are immobilized relative to each other;

(d) mounting the first pressure-expansible sleeve and the first and second members onto a second pressure-expansible sleeve having a bore therein;

(e) positioning a rotatable spindle in the bore of the second pressure-expansible sleeve; and (f) locking the second pressure-expansible sleeve onto the spindle by pressurizing the second pressure-expansible sleeve to thereby immobilize the second pressure-expansible sleeve and the spindle relative to each other.

* * * * *